US007151541B2

(12) United States Patent
Seder

(10) Patent No.: US 7,151,541 B2

(45) Date of Patent: Dec. 19, 2006

(54) MOVEABLE ANIMATED DISPLAY DEVICE

(76) Inventor: Rufus Butler Seder, 971 Commonwealth Ave., Boston, MA (US) 02215

( * ) Notice: Subject to any disclaimer, the term of this patent is extended or adjusted under 35 U.S.C. 154(b) by 209 days.

(21) Appl. No.: 11/031,873

(22) Filed: Jan. 7, 2005

(65) Prior Publication Data

US 2005/0183300 A1 Aug. 25, 2005

Related U.S. Application Data

(60) Provisional application No. 60/534,894, filed on Jan. 8, 2004.

(51) Int. Cl.
*G06T 15/00* (2006.01)

(52) U.S. Cl. .......................... 345/473; 40/445; 40/488; 283/117

(58) Field of Classification Search ................ 345/473; 40/375, 436, 445, 453, 488, 491, 495; 283/115, 283/117; 434/405
See application file for complete search history.

(56) References Cited

U.S. PATENT DOCUMENTS

| | | | | |
|---|---|---|---|---|
| 1,259,297 | A | 3/1918 | Russell | 40/445 |
| 1,285,753 | A | 11/1918 | Lowenstein | 283/114 |
| 1,474,572 | A | 11/1923 | Whitstock | 283/81 |
| 2,085,803 | A | 7/1937 | Harrison | 40/445 |
| 2,367,967 | A | 1/1945 | Schwartz | 40/445 |
| 2,374,371 | A | 4/1945 | Morch | 40/437 |
| 2,398,257 | A | 4/1946 | Schwartz | 40/445 |
| 3,268,238 | A | 4/1966 | Finkel | 40/427 |
| 3,314,179 | A | 4/1967 | Leach | 40/437 |
| 3,643,361 | A | 2/1972 | Eaves | 40/437 |
| 3,862,504 | A | 1/1975 | Ringeleim et al. | 40/437 |
| 4,118,879 | A | 10/1978 | Simon | 40/437 |
| 4,789,573 | A | 12/1988 | Jenkinson | 40/330 |
| 4,885,193 | A | 12/1989 | Head | 40/453 |
| 5,695,346 | A | 12/1997 | Sekiguchi et al. | 40/436 |
| 5,782,026 | A | 7/1998 | Capie | 40/453 |
| 5,823,344 | A | 10/1998 | Fantone et al. | 40/436 |
| 5,901,484 | A | 5/1999 | Seder | 40/488 |
| 6,286,873 | B1 | 9/2001 | Seder | 283/117 |
| 6,781,761 | B1 * | 8/2004 | Raymond | 359/619 |
| 6,886,280 | B1 * | 5/2005 | Spodek et al. | 40/453 |
| 7,000,343 | B1 * | 2/2006 | Teichman | 40/436 |

* cited by examiner

*Primary Examiner*—Phu K. Nguyen
(74) *Attorney, Agent, or Firm*—O'Connell Law Firm

(57) ABSTRACT

A moveable animated display device for displaying a plurality of images with a pressure plate carrier, a pressure plate retained in relation to the pressure plate carrier, a plurality of coded images, a plurality of shutter elements slidably retained in relation to the plurality of coded images, and at least one biasing formation, such as a crease, in the pressure plate for inducing a biasing of the pressure plate toward the pressure plate carrier. The display device can have the pressure plate slidably retained relative to the pressure plate carrier, and the biasing formation can be parallel or orthogonal to a path of travel of the pressure plate in relation to the pressure plate carrier. The display device can comprise a card wherein a pivoting of a cover member relative to a base member induces animation as an animation layer slides in relation to the pressure plate.

29 Claims, 9 Drawing Sheets

MOVEABLE ANIMATED DISPLAY DEVICE

This application claims benefit of application Ser. No. 60/534,894 filed on Jan. 8, 2004.

FIELD OF THE INVENTION

The present invention relates generally to display devices. More particularly, disclosed herein is a moveable animated display device for displaying a plurality of images in response to a movement of a shutter member relative to an image member.

BACKGROUND OF THE INVENTION

Devices permitting the sequential display of a plurality of coded images by relative movement of an image member relative to a shutter member have been known for many years. The image member has a plurality of interposed coded images disposed thereon while the shutter member has a plurality of shutter elements disposed thereon that are separated by a plurality of viewing elements. The shutter elements perform the dual functions of selectively blocking from view all but one of the interposed coded images while bridging the gaps between the coded strips that form what can be termed an active image. With this, the plurality of shutter elements decode the active image of the plurality of coded images, and the active image appears to be a complete, coherent image.

When the image member and the shutter member undergo relative movement by a predetermined amount, the strips of the previously active image are concealed and the next succeeding coded image assumes the fleeting position as an active image. This procedure will continue through a cycle of all coded images that are disposed on the image member. Once the cycle is complete, the first coded image will again appear to start a new, identical cycle. The number of unique coded images is mathematically limited by the width of the shutter element relative to the width of the strips that form the coded images. Stated more particularly, the number of coded images cannot exceed one plus the result of the width of each shutter element divided by the width of each coded image strip.

As one knowledgeable in the art will appreciate, the ability of a display device to display images with clarity and resolution is dependent not only on the number of discrete images that can be displayed but also on the ability of the device to obtain precise registration and alignment between the coded images and the shutter elements and to maintain that precise registration during relative movement within the device. Just as critical to the performance of such display devices is the ability of the device to induce and maintain close contact between the shutter elements and the coded images over their entire display surfaces.

Lack of complete contact between the shutter elements and the coded images creates thin air pockets between the layers thereby creating undesirable shadows that diminish the observer's ability to perceive the display image. Incomplete contact also results in an undesirable parallax viewing conflict where multiple images can be perceived due to the ability of the observer to see around and, therefore, behind the shutter elements.

Where complete contact between the shutter elements and the coded images can not be achieved, the intended animation effect will be frustrated and, additionally or alternatively, the designer will be forced to compensate by implementing a design with sufficiently few animation phases to eliminate the viewing conflicts and other resulting disadvantages. Conversely, where better contact can be achieved, more phases of animation are possible thereby enabling more advanced and intricate animation sequences.

The prior art has employed numerous arrangements including corrective spring-loaded pressure plates, bent tab systems, and similarly complex arrangements in seeking to achieve and maintain precise alignment and consistently close contact between shutter element and coded image layers. Such arrangements have worked to some degree of success but have proven to be bulky, expensive, complex in structure and function, and often unreliable. These and further factors have limited and even entirely prevented the ability of such devices to achieve widespread market success including relative to the advertising, direct mail, greeting card, book, magazine, packaging, and other markets.

The present inventor advanced this art with, among other things, the disclosure provided by his U.S. Pat. No. 5,901,484 for a Manually-Operated Moveable Display Device and his U.S. Pat. No. 6,286,873 for a Visual Display Device With Continuous Animation, each being incorporated herein by reference. The '484 patent presented solutions to many of the deficiencies of the prior art with its disclosure of an arrangement with inner and outer cylinders having coded images and shutter elements imprinted thereon and with creases formed in the cylinders such that the cylinders themselves exert a contact pressure therebetween by virtue of their being formed from a resilient material. Such arrangements have represented advantageous improvements due their simplicity and effectiveness and their ability to be employed in markets that have been inaccessible to the prior art.

Nonetheless, it has become clear that there remains a need for new moveable display device constructions that are still flatter and more compact to enable, among other things, their use in applications where moveable display devices previously could not be applied. Of course, it would also be an advantageous improvement to provide moveable display devices that are simple and inexpensive in structure and function while being able to achieve and maintain accurate alignment and close contact between a shutter element layer and a coded image layer.

SUMMARY OF THE INVENTION

Advantageously, the present invention is founded upon a basic object of providing a moveable animated display device that overcomes the disadvantages of prior art moveable display devices.

A more particular object of the invention is to provide a moveable display device that can achieve a relatively flat and compact configuration.

A further object of the invention is to provide a moveable display device that achieves and maintains accurate registration and close contact between a shutter element layer and a coded image layer.

Yet another object of the invention is to provide a moveable display device that is capable of displaying a plurality of sharp and intricate images that change from one to another in a fluidic manner.

A further object of embodiments of the invention is to provide a moveable display device that can be hand held and manually operable.

Yet another object of particular embodiments of the invention is to accomplish these goals in a moveable display device that is can be simple in structure, operation, and manufacture.

These and still further objects and advantages of the invention will be readily apparent not only to one who reviews the present specification and drawings but also to one who has the opportunity to enjoy the use of an embodiment of the present invention for a moveable animated display device.

One will appreciate that the foregoing outlines certain features of the invention merely to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of the many possible manifestations of the invention.

DETAILED DESCRIPTION OF PREFERRED EMBODIMENTS

The present invention for a moveable animated display device is subject to widely varied embodiments. However, to ensure that one skilled in the art will be able to understand and, in appropriate cases, practice the present invention, certain preferred embodiments of the broader invention revealed herein are described below and shown in the accompanying drawing figures.

Figure 1:
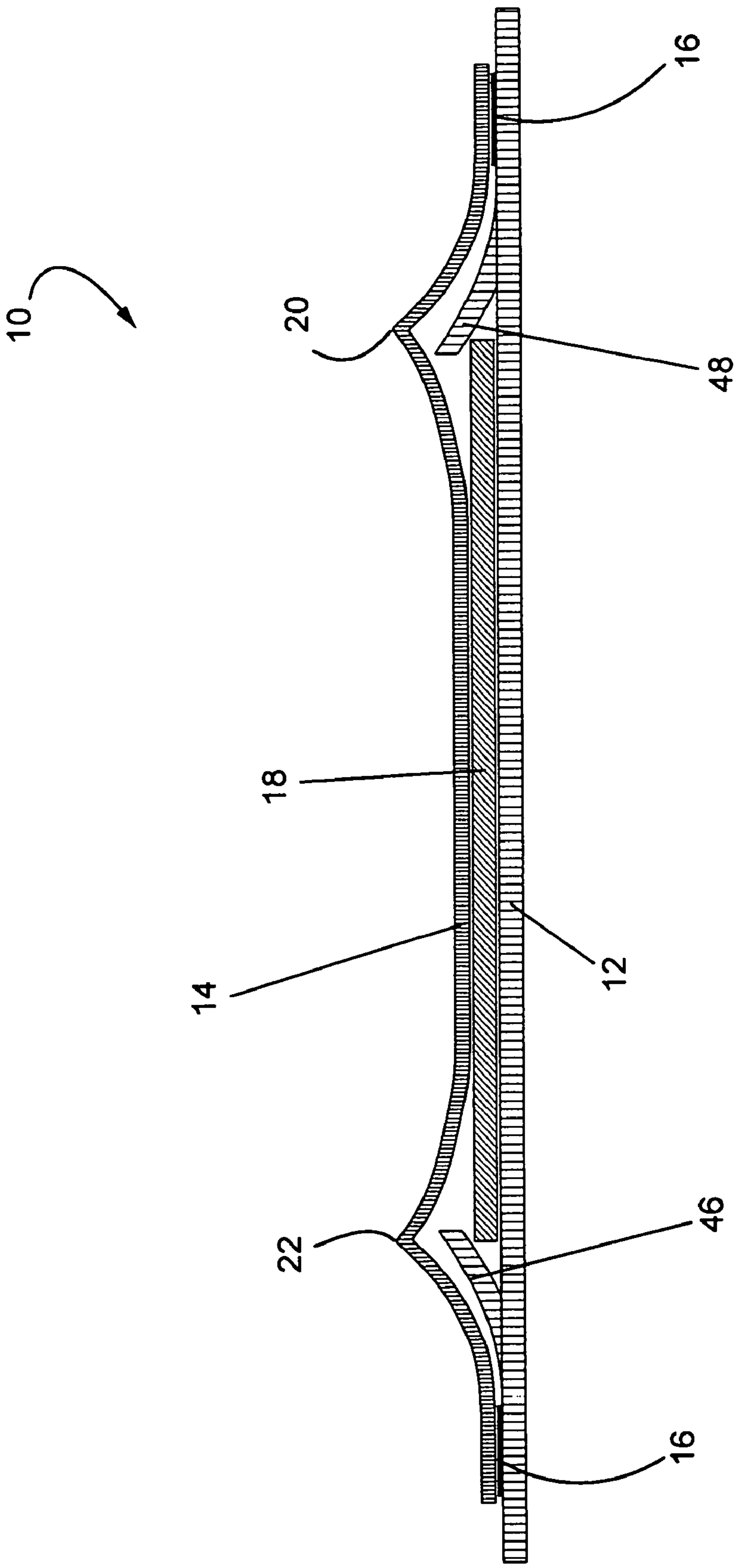
FIG. 1 is a cross-sectional view in side elevation of an embodiment of a moveable animated display device according to the present invention.

Looking more particularly to the drawings, an exemplary embodiment of a moveable animated display device according to the present invention is shown in simplified form in FIG. 1 where the device is indicated generally at 10. There, the moveable animated display device 10 is founded on what may be termed a pressure plate carrier 12. A pressure plate 14 has first and second end portions fixed to the pressure plate carrier 12 by any appropriate means, such as adhesive strips 16 as shown in FIG. 1, mechanical fasteners, frictional retention, or any other effective arrangement. A relatively moveable animation layer 18 has at least a portion thereof slidably interposed between the pressure plate 14 and the pressure plate carrier 12.

Figure 2:
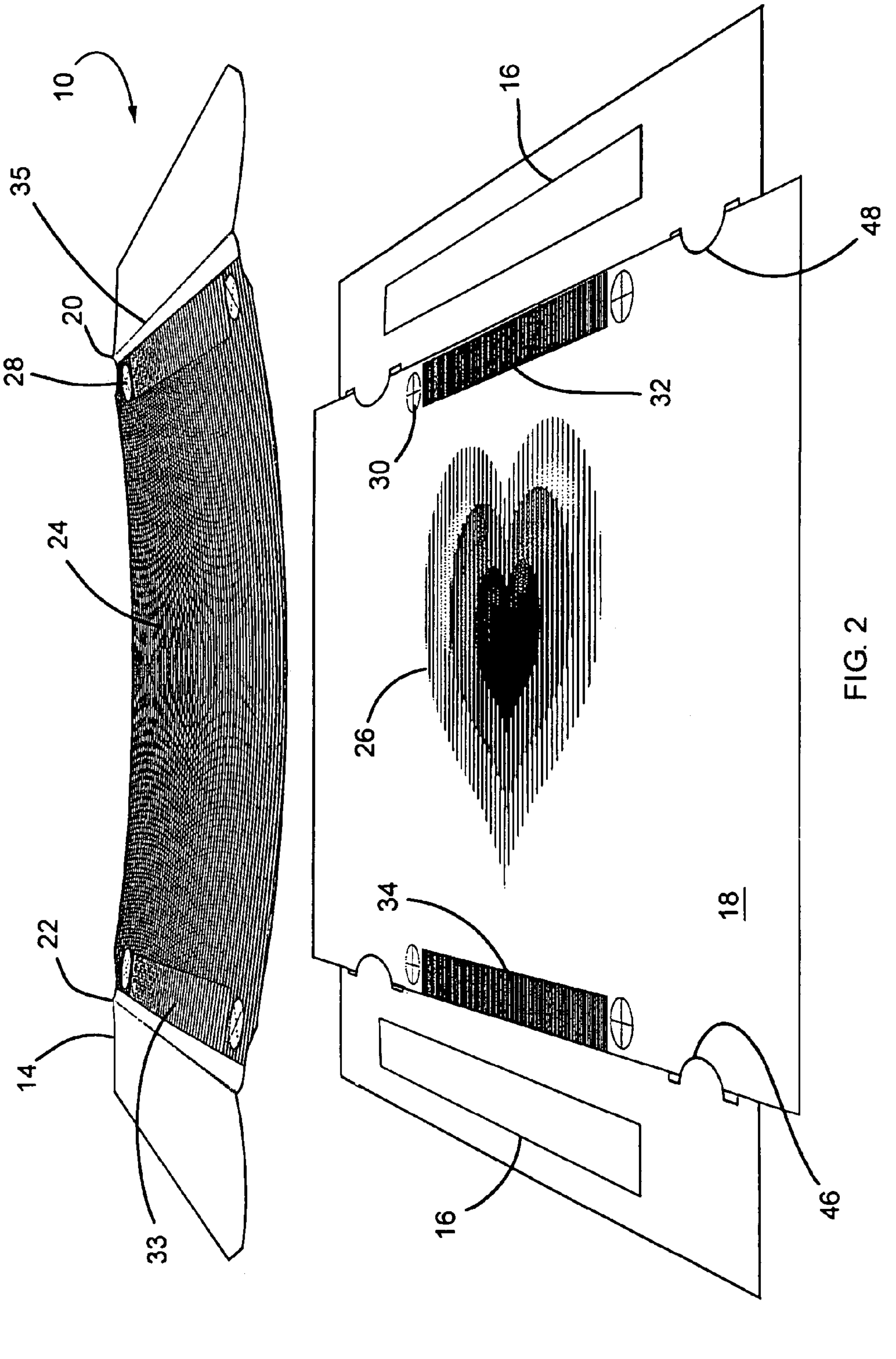
FIG. 2 is a perspective view of a further embodiment of a moveable animated display device pursuant to the present invention.

As FIG. 2 shows, the pressure plate 14 can have shutter elements 24 disposed thereon while the animation layer 18 can have coded images 26 disposed thereon. It should be noted, of course, that the relative disposition of the shutter elements 24 and the coded images 26 could be readily interchanged such that the coded images 26 could be disposed on the pressure plate 14 and the shutter elements 24 could be disposed on the animation layer 18. The depicted disposition of the shutter elements 24 and the coded images 26, while possibly preferred under certain arrangements, is merely exemplary. Particularly where the coded images 26 and the shutter elements 24 have been printed with the same color ink, the animated effect will be similar regardless of which is imprinted on or otherwise applied or coupled to the pressure plate 14 and which is imprinted on or otherwise applied or coupled to the animation layer 18. It will be equally clear that the depicted coded images 26, namely a series of heart designs, are mere examples of the infinite variety of coded images 26 possible under the present invention.

It should be clear that the plurality of shutter elements 24 may assume a wide variety of shapes including straight bars, curving bars, apertured opaque portions, and any other functioning configuration. Naturally, the shapes of the coded images 26 would correspond to the shapes of the shutter elements 26. The plurality of viewing elements interposed between the shutter elements 24 could comprise open slots, transparent bars, or any other means that would allow a selective viewing of the coded images 26.

In any case, a movement of the animation layer 18 relative to the pressure plate 14 and thus the pressure plate carrier 12 will induce the moveable animated display device 10 to exhibit animation as the shutter elements 24 act to complete successive coded images 26 to translate the coded images 26 into a series of coherent images. As noted previously, achieving close and consistent contact between the image carrying layer, in this example the animation layer 18, and the shutter element carrying layer, in this case the pressure plate 14, is crucial to obtaining smooth and crisp image displays and transitions between images. The present invention achieves that close contact between the imaging portions of the pressure plate 14 and the animation layer 18 by, among other things, the formation of first and second biasing formations 20 and 22 in the pressure plate 14 such that the pressure plate 14 acts as its own spring-loaded biasing arrangement.

In this example, the biasing formations 20 and 22 comprise creases in the pressure plate 14 that are disposed in an essentially parallel disposition. However, one will appreciate that numerous other biasing formations 20 and 22 could be effective in biasing the central, imaging portion of the pressure plate 14 into close contact with the animation layer

18 and the pressure plate carrier 12. By way of example and not limitation, properly formed curves, bends, and still other configurations and mechanisms could induce the desired biasing and, as such, are well within the scope of the present invention. It should also be clear that embodiments of the invention are possible where just one or more than two biasing formations 20 and 22 could be employed. Under the exemplary constructions of FIGS. 1 and 2, the display device 10 exploits the leverage exerted by the crease biasing formations 20 and 22 to achieve and maintain close contact between the pressure plate 14, the animation layer 18, and the pressure plate carrier 12.

The components of the display device 10 could be formed from numerous different materials. In one presently contemplated embodiment, the pressure plate 14 is formed from a resiliently deflectable material, which can comprise a polymeric material. Even more particularly, the pressure plate 14 can be formed from a flexible die-cut transparent piece of medium-weight acetate or a similar clear or translucent material imprinted with opaque shutter elements 24. The animation layer 18, which in this embodiment carries the coded images 26, can be formed of any suitable material. The material can be opaque or, in certain embodiments, clear or translucent. In one example, the animation layer 18 can be formed from paper card stock. To facilitate a smooth sliding of the animation layer 18 relative to the pressure plate 14 and the pressure plate carrier 12, the animation layer 18 can have parallel, smooth, and straight opposed side edges.

As FIG. 2 shows, the pressure plate 14 can have a plurality of encircled "X" registration marks 28 disposed thereon while the animation layer 18 can have a plurality of corresponding "cross" registration marks 30 disposed thereon. The registration marks 28 and 30 can ensure an accurate initial alignment of the shutter elements 24 of the pressure plate 14 relative to the coded images 26 of the animation layer 18. More particularly, by use of the registration marks 28 and 30, the alignment of the pressure plate 14 relative to the animation layer 18 can be confirmed based on an alignment of the centers of the "X" registration marks 28 with the centers of the "cross" registration marks 30. In certain embodiments, as is shown in FIGS. 2 through 5, micro alignment strips 32, 33, 34, and 35 can additionally be provided on the pressure plate 14 and the animation layer 18 to enable still more accurate relative alignment.

Figure 3:
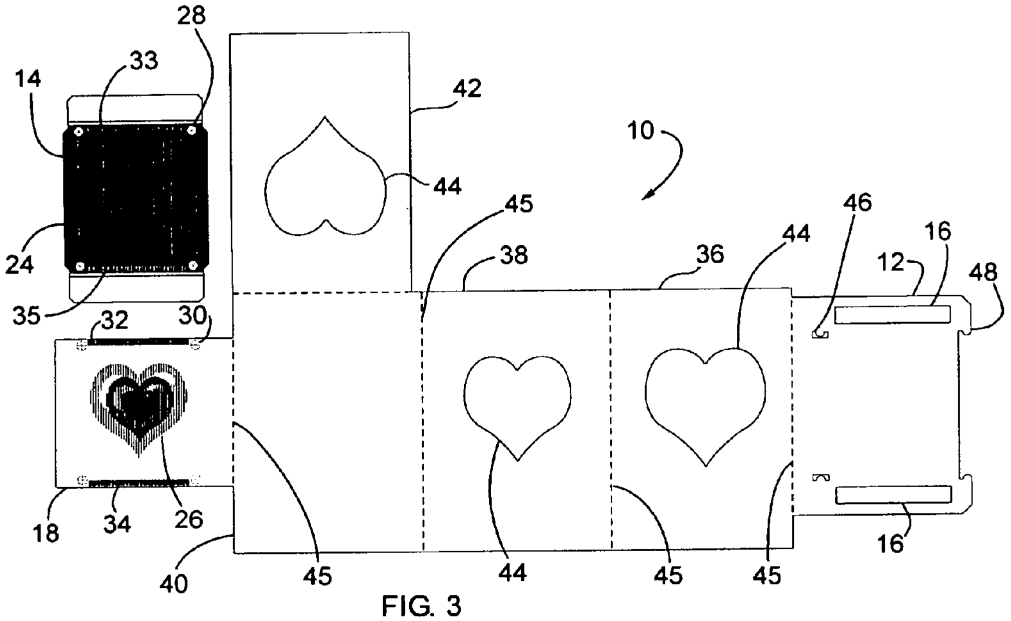
FIG. 3 is a top plan view of a first side of yet another embodiment of a moveable animated display device according to the present invention in a pre-assembly configuration.
Figure 4:
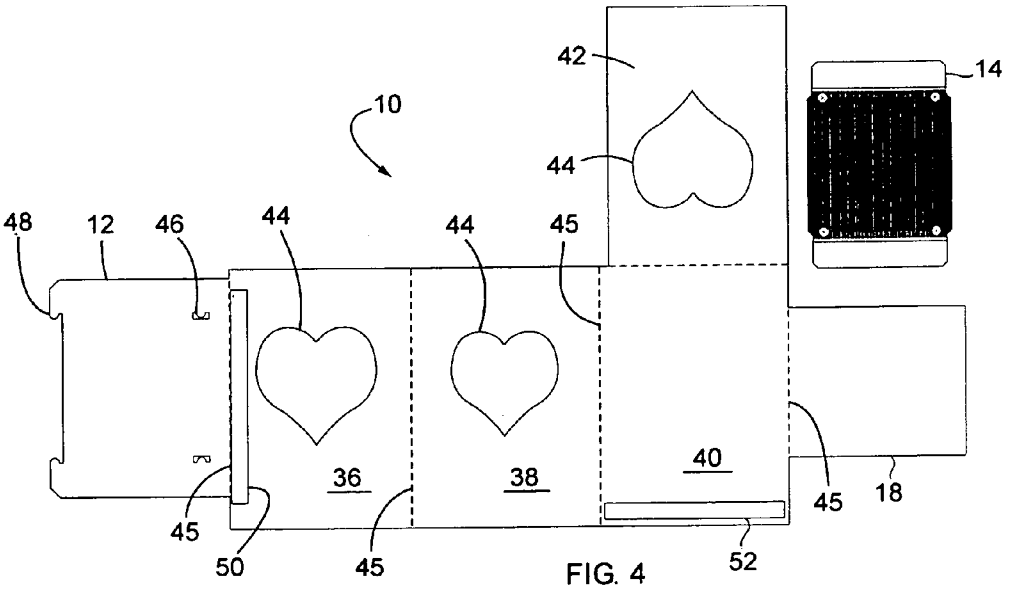
FIG. 4 is a top plan view of a second side of the moveable animated display device of FIG. 3 again in a pre-assembly configuration.
Figure 5:
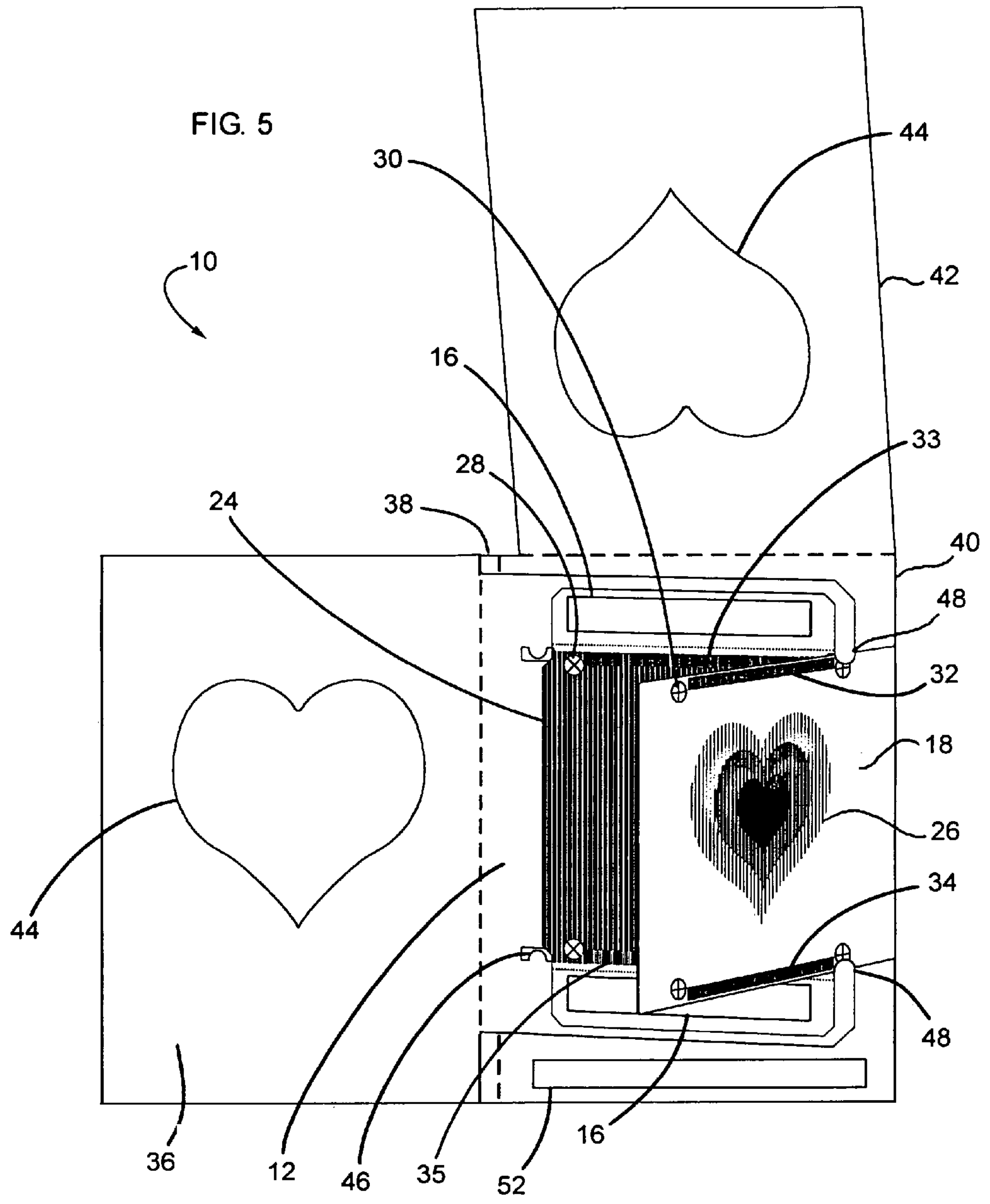
FIG. 5 is a perspective view of the moveable animated display device of FIGS. 3 and 4 in a partially assembled configuration.

As one can perceive by reference to FIGS. 3 through 5, opposed tabs 46 and 48 can maintain the animation layer 18 in proper orientation and alignment relative to the pressure plate 14 and can ensure that the animation layer 18 slides in perpendicular relation to the shutter elements 24 of the pressure plate 14. The tabs 46 and 48 can project inboard from the pressure plate carrier 12 to overlie the animation layer 18 when the display device 10 is fully assembled. While there can be substantially any number of opposed tabs 46 and 48, one presently preferred embodiment has two tabs 46 disposed to a first side of the animation layer 18 and two tabs 48 disposed to a second side of the animation layer 18. The tabs 46 and 48 can be affixed to the pressure plate carrier 12, or, as is shown in FIGS. 3 through 5, they can be formed integrally therewith, as by a die cutting process.

During assembly of the display device 10, the animation layer 18 can be applied to the pressure plate carrier 12 by being caused to underlie the tabs 46 and 48. The pressure plate 14 can then be positioned over the pressure plate carrier 12 with the biasing formations 20 and 22 pointing outward such that the convex portion of the pressure plate 14 faces the animation layer 18 and the pressure plate carrier 12. The registration marks 28 on the pressure plate 14 should then be exactly aligned with the registration marks 30 on the animation layer 18. While maintaining that precise alignment, the pressure plate 14 can then be adhered to the first adhesive strip 16 near the first edge of the pressure plate carrier 12 and then, while keeping the pressure plate 14 as flat as possible, the pressure plate 14 can be adhered to the second adhesive strip 16 near the second edge of the pressure plate carrier 12.

With that, the animation layer 18 will be effectively sandwiched between the pressure plate 14 and the pressure plate carrier 12 and will be viewable through the pressure plate 14 as the animation layer 18 is held snugly by the pressure plate 14 against the pressure plate carrier 12. Under this arrangement, the pressure plate 14 can be held in tension by the adhesive strips 16 and can ensure complete contact between the animation portion of the pressure plate 14 and the animation layer 18. The relationship of the tabs 46 and 48 of the pressure plate carrier 12 and the edges of the animation layer 18 ensure accurate alignment and slideability.

For optimal image display, the animation layer 18 should maintain registration relative to the pressure plate 14 while demonstrating minimal "wiggle" during movement. It has been found that these can be competing characteristics. In practice, an ideal spacing between the tabs 46 and 48 and the edges of the animation layer 18 can often be found through trial and error while designing the display device 10 and the tools, such as cutting dies, that will be used in manufacture. Different thicknesses and textures of the substrate, such as card stock, may require different die cutting tolerances. In any case, the edges of the animation layer 18 should be cut as straight and smooth as possible since rough edges may inhibit free sliding of the animation layer 18 relative to the tabs 46 and 48. In practice, it may be possible to ensure proper registration and an ease of sliding by a "tweaking" of the four tabs 46 and 48, such as by bending them slightly upward or downward or otherwise manipulating them. Ideally, however, a properly adjusted tolerance will eliminate any need for manipulation.

As mentioned previously, animation will occur as relative movement is carried out between the animation layer 18 and the pressure plate 14 to cause the coded images 26 to be sequentially completed and rendered coherent by the shutter elements 24. Relative movement could be achieved by inducing the animation layer 18 to travel while the pressure plate carrier 12, which has the pressure plate 14 fixed thereto, remains motionless. Alternatively, relative movement could be triggered by inducing the pressure plate carrier 12, which has the pressure plate 14 fixed thereto, to travel while the animation layer 18 remains motionless. Still further, relative movement could be realized by simultaneous movements of the pressure plate carrier 12 and the animation layer 18 either in opposite directions or in the same direction at different speeds. The relative movement could be caused by a motorized arrangement or manually.

It will be noted that attaining and maintaining consistent registration between the animation layer 18 and the pressure plate carrier 12 can be achieved by a number of different arrangements. Of course, it can be achieved pursuant to the abovedescribed arrangement wherein a smooth-sided animation layer 18 is guided by tabs 46 and 48 that overlie it from the pressure plate carrier 12 disposed therebelow. Alternatively, however, the animation layer 18 could forego the smooth sides and instead have a plurality of tabs extending therefrom for insertion into precut slots in the pressure plate carrier 12.

Figure 9:
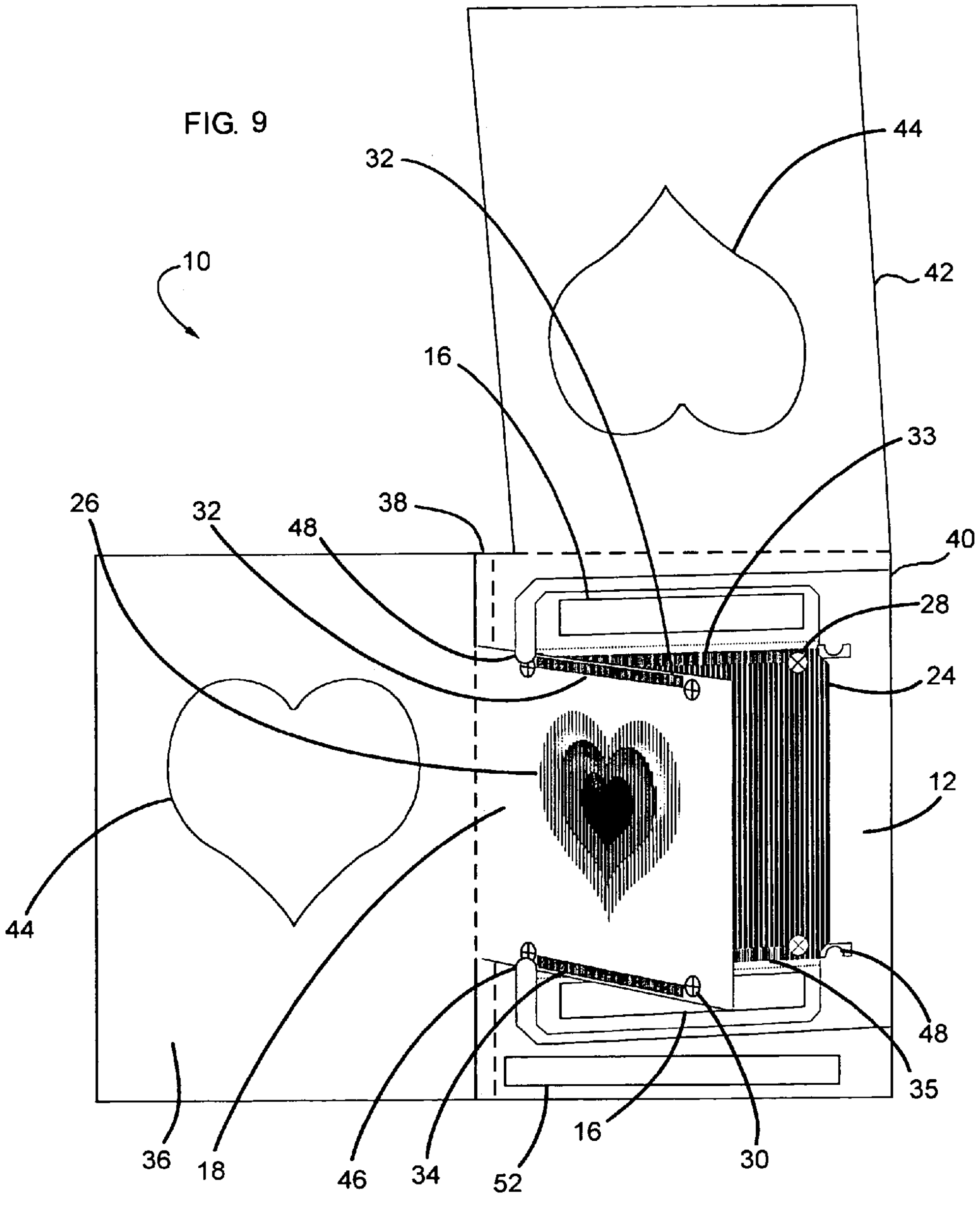
FIG. 9 is a perspective view of a variation of the moveable animated display device of FIGS. 3 and 4, again in a partially assembled configuration.
Figure 10:
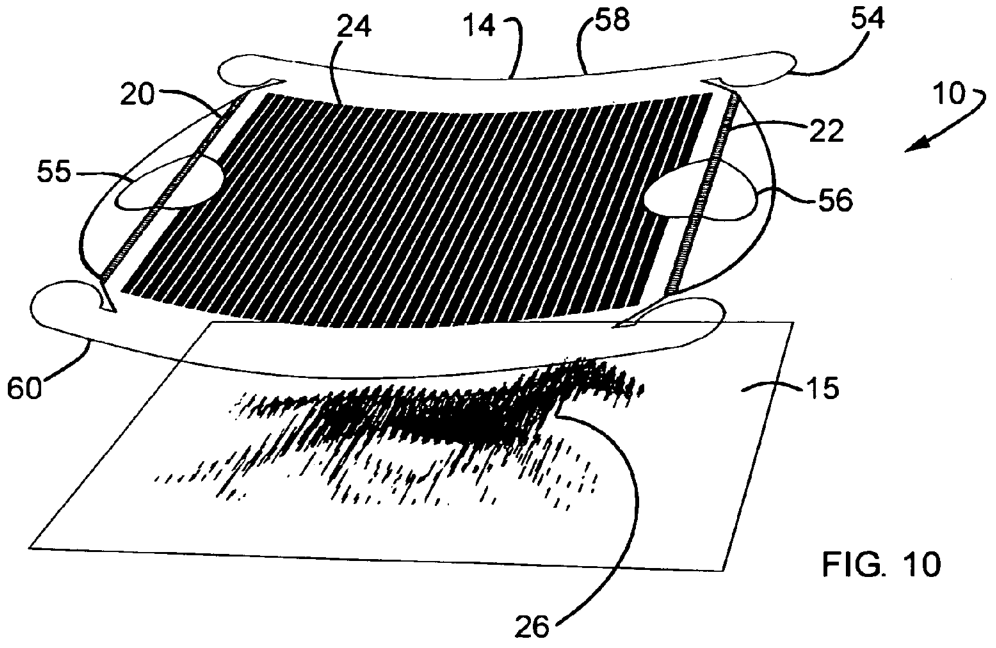
FIG. 10 is a perspective view of a further embodiment of a moveable animated display device as taught herein in a disassembled configuration.
Figure 11:
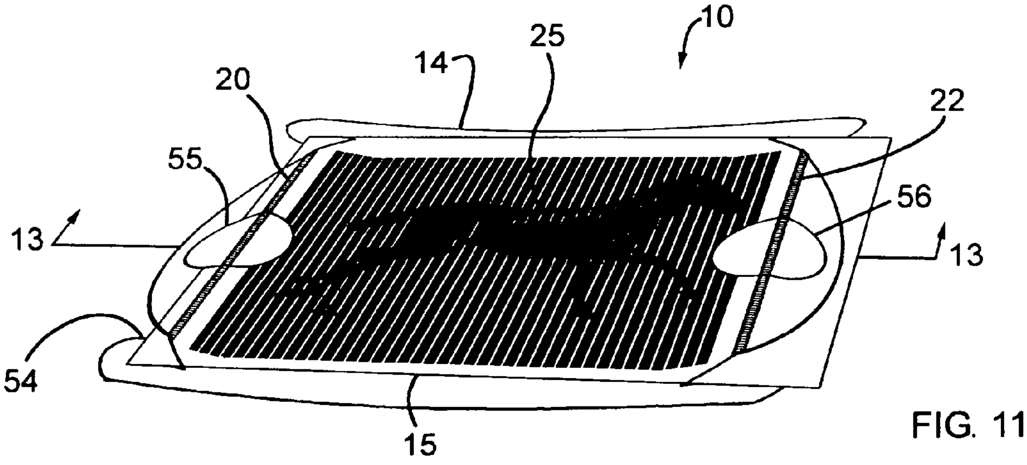
FIG. 11 is a perspective view of the moveable animated display device of FIG. 10 in an assembled configuration.

One skilled in the art will find numerous applications for arrangements taking advantage of the aforedescribed invention. Each such application should be considered to be well within the scope of the present invention. One example of the many applications of the invention is shown in FIGS. 3 through 5 and 9 where the display device 10 takes the form of a card, such as a greeting card, an invitation, an announcement, an advertisement, any other possible type of card. In FIG. 3, the display device 10 is shown in a pre-assembly format from a first side. FIG. 4 again shows the display device 10 in a pre-assembly format but from a second side. FIG. 5 shows the display device 10 in a partially assembled format, and FIG. 9 shows a variation on the card version of the display device 10.

In FIGS. 3 through 5, the display device 10 has a base foundation panel 40 that is hingedly coupled at a first side edge to the animation layer 18, at a second side edge to a first side edge of a first cover panel 38, and at an upper edge to a shield panel 42. The first cover panel 38 has a second side edge hingedly coupled to a first side edge of a second cover panel 36, and the second cover panel 36 has a second side edge hingedly coupled to the pressure plate carrier 12. The first cover panel 38, the second cover panel 36, and the shield panel 42 each have cutouts 44 formed therein that correspond to, and ultimately align with, the coded images 26. As FIG. 4 shows, the second cover panel 36 can have an adhesive strip 50 disposed thereon for enabling it to affix to the first cover panel 38. Similarly, the base foundation panel 40 has an adhesive strip 52 disposed thereon for enabling it to affix to the shield panel 42.

The display device 10 can thus be formed into the configuration depicted in FIG. 5 by a folding over and affixing of the panels 36, 38, 40, and 42. As one will appreciate, the animation layer 18 in FIG. 5 is shown pivoted outside of the pressure plate 14 for clarity of the construction of the display device 10 only. It would normally already be slidably retained under the pressure plate 14. Also for clarity, only a portion of the shutter elements 24 are shown in FIG. 5. Still further, the shield panel 42 is shown in an upright position for clarity only. Normally, it would be affixed by the adhesive strip 52 overlying the pressure plate 14, the animation layer 18, and other components of the display device 10 essentially leaving only the imaging portion of the display device 10 exposed for viewing through the cutout 44, which in this example happens to be in the shape of a heart.

From FIG. 5, one will appreciate that the second cover panel 36 is narrower than the first cover panel 38. As a result, the edge of the pressure plate carrier 12, which extends from the edge of the second cover panel 36, is displaced from the hinged connection of the first cover panel 38 with the base foundation panel 40. Under this arrangement, a pivoting of the structure formed by the first and second cover panels 38 and 36, which essentially comprises the cover of the card, will induce a movement of the pressure plate carrier 12 relative to the animation panel 18 thereby inducing an animation display by the display device 10 as described previously.

As one will appreciate by reference to FIG. 9, the animation layer 18 and the pressure plate carrier 12 could be disposed in an essentially opposite manner than that of FIGS. 3 through 5. More particularly, the base foundation panel 40 is coupled to the first cover panel 38 and to the shield panel 42 as before but is hingedly coupled at its first side edge to the pressure plate carrier 12 instead of the animation layer 18 as in FIGS. 3 through 5. The animation layer 18 can replace the pressure plate carrier 12 as the component hingedly coupled to the second side edge of the second cover panel 36. The display device 10 can be otherwise essentially identical to the previously described embodiment.

Of course, it will be appreciated that the depicted arrangement of the first and second cover panels 38 and 36 combining to provide the pressure plate carrier 12 or the animation layer 18 with a hinged coupling displaced from the hinged coupling of the second cover panel 38 relative to the base foundation panel 40 is merely exemplary. One skilled in the art will be aware of numerous other arrangements for creating a displaced pivoting of the pressure plate carrier 12 or the animation layer 18 in relation to a cover panel, such as that formed by the combination of the first and second cover panels 38 and 36. Each arrangement is within the scope of the present invention.

It will again be noted that accurate alignment and precise registration of the shutter elements 24 in relation to the coded images 26 are critical to the optimal performance of the display device. However, achieving that alignment and registration is challenging including in particular the embodiments of FIGS. 3–5 and 9. Referring again to FIGS. 3 and 4, it will be noted that, prior to assembly, the pressure plate carrier 12 and the animation layer 18 are separated by a plurality of folds that must be made to bring the components into slidable association. For the shutter elements 24 and the coded images 26 to be aligned and for the display device 10 to open and close properly, the folds between the animation layer 18, the base foundation panel 40, the first cover panel 38, the second cover panel 26, and the pressure plate carrier 12 must be made precisely in location and orientation. An improper location or orientation of one fold will inherently affect the location or orientation of the remaining folds, potentially with a magnifying effect, thereby producing a display device 10 that may not operate or animate properly.

It has been found that achieving consistently precise locating and orientating of the folds in the display device 10 is difficult in relation to a plain blank of material. Furthermore, even where the folds are initiated in precise locations and orientations, such as by stamping or similar operations, the nature of many substrates, such as card stock, is that the resulting fold itself tends to be relatively wide and imprecise. The width and imprecision of such folds derogates from the accuracy with which the display device 10 can be assembled and operated.

Through experimentation, the present inventor has discovered that folds of improved accuracy and precision can be achieved by the creation of a series of perforations, notches, scorings, serrations, or other aligned surface variations in the substrate having the desired location and orientation of the fold. In FIGS. 3–5 and 9, for example, the folds between the animation layer 18, the base foundation panel 40, the first cover panel 38, the second cover panel 26, and the pressure plate carrier 12 have perforated lines 45 therebetween. The perforated lines 45 are disposed in precise location and orientation. With this, when, for example, the animation layer 18 is folded in relation to the base foundation panel 40, the fold therebetween will tend to be exactly along the perforated line 45. The resulting fold is, therefore, narrower and more precise than the fold that would have resulted absent the aligned surface variations, which in this example comprise the perforations that form the perforated line 45.

It will be noted that the nature of the surface variations may vary depending on a number of factors including the nature of the substrate employed and the desired characteristics and durability of the resulting product. For example, in certain embodiments or in relation to certain folds, relatively large perforations can form the perforated line 45. In other embodiments, however, the roughness and reduction of durability that can derive from relatively large perforations may be undesirable and may warrant the use of relatively small perforations. Also, it will again be noted that perforations are merely exemplary, other surface variations may be employed to similar effect.

Figure 7:
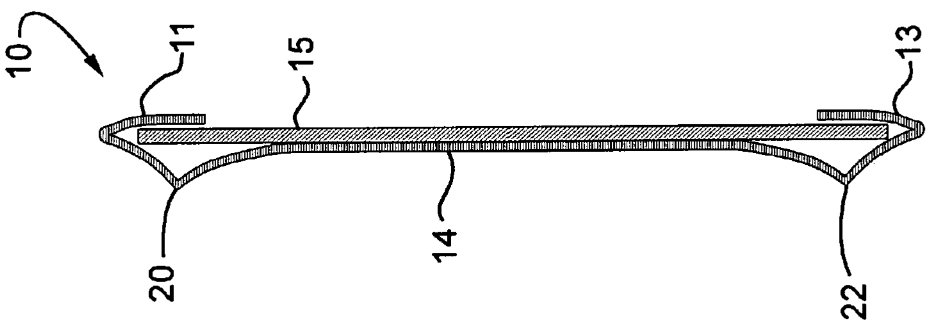
FIG. 7 is a cross-sectional view in side elevation of still another embodiment of a moveable animated display device under the present invention.
Figure 6:
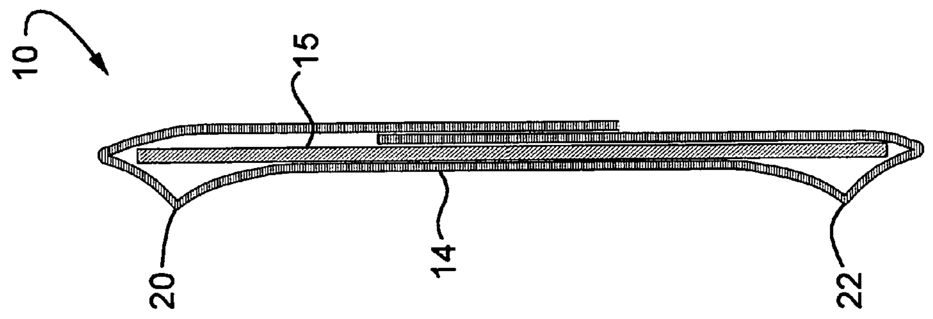
FIG. 6 is a cross-sectional view in side elevation of another embodiment of a moveable animated display device.

Again, many further embodiments of the invention are possible. FIGS. 6 and 7 show alternative constructions of the display device 10 wherein the display device 10 can be formed by essentially just two elements, namely, a pressure plate 14 and a pressure plate carrier, which can alternatively be termed a base member 15. The base member 15 can be a rigid panel of material and can have smooth first and second edges. In certain examples, the base member 15 can be a card of any type including, by way of example, a credit card, an advertising card, a membership card, a gift card, an identification card, a novelty card, and any other type of card. The pressure plate 14 can again have biasing formations 20 and 22 disposed adjacent to the edges of the base member 15 for biasing the central portion of the pressure plate 14 into close contact with the adjacent face of the base member 15.

As FIG. 6 shows, the pressure plate 14 can in certain embodiments wrap entirely around the base member 15 and can have distal ends affixed together. Alternatively, as FIG. 7 shows, the pressure plate 14 can have simple clip portions 11 and 13 that overlie the edges of the base member 15. In either case, coded images 26 can be disposed on one of the pressure plate 14 or the adjacent face of the base member 15 while shutter elements 24 can be disposed on the other of the pressure plate 14 and the base member 15. Under such a construction, animation can be achieved with close contact and accurate alignment between the pressure plate 14 and the base member 15 by a simple sliding of the pressure plate 14 relative to the base member 15.

Figure 8:
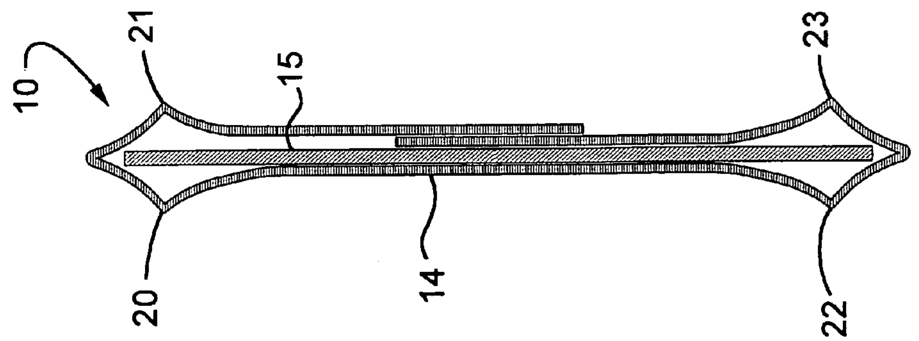
FIG. 8 is a cross-sectional view in side elevation of a further embodiment of a moveable animated display device under the present invention.

The first and second biasing formations 20 and 22, which are to what can be termed the display side of the display device 10, may well induce sufficient contact between the imaging portion of the pressure plate 14 and the base member 15. In certain embodiments, however, still better contact may be achieved by providing third and, possibly, fourth biasing formations 21 and 23 to the obverse side of the display device 10. Such a construction is depicted in FIG. 8. There, the pressure plate 15 wraps entirely around the base member 15 and third and fourth biasing formations 21 and 23 are formed to the obverse side of the display device 10 adjacent to the edges thereof. The third and fourth biasing formations 21 and 23 can cooperate with the first and second biasing formations 20 and 22 to induce enhanced contact between the display portions of the pressure plate 14 and the base member 15. Again, the biasing formations 20, 21, 22, and 23 are shown as elongate creases in the pressure plate 14. However, numerous other formations, each within the scope of the present invention, could operate with similar effect.

A further variation of a display device 10 wherein a pressure plate 14 combines with a pressure plate carrier comprising a base member 15 to produce animation is depicted in FIGS. 10–12, 13A, and 13B. The pressure plate 14 again has first and second biasing formations 20 and 22 for inducing complete contact between animation portions of the pressure plate 14 and the base member 15. However, the biasing formations 20 and 22 are formed adjacent to the opposed ends of the pressure plate 14 and generally perpendicular to the path of travel of the pressure plate 14 in relation to the base member 15.

The pressure plate 14 has a plurality of tabs 54 projecting inboard from a header portion 58 and a footer portion 60. The tabs 54 project in general opposition from a distance slightly greater than a width of the base member 15 to a distance less than the width of the base member 15. With this, the pressure plate 14 can be slidably engaged with the base member 15 by causing the tabs 54 to be disposed to the obverse side of the base member 15 while the body portion of the pressure plate 14 is disposed to the display side of the base member 15.

Figure 12:
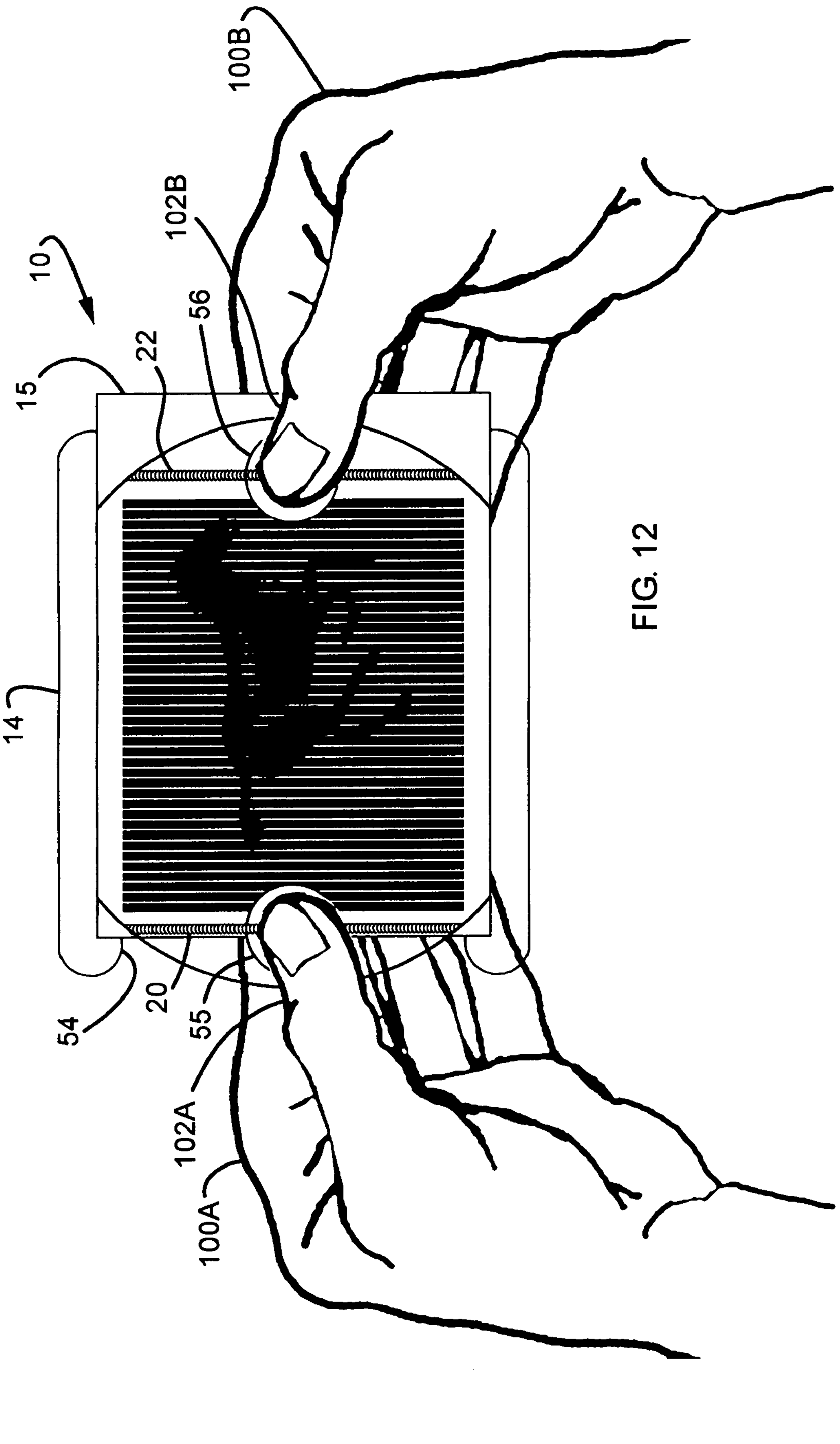
FIG. 12 is a top plan view of the moveable animated display device of FIG. 10 in operation.
Figure 13A:
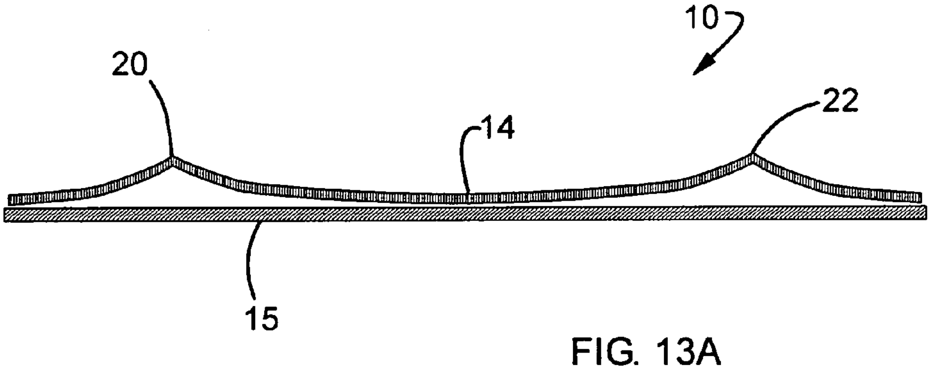
FIG. 13A is a cross-sectional view of the moveable animated display device taken along the line 13—13 in FIG. 11 in an uncompressed condition.
Figure 13B:
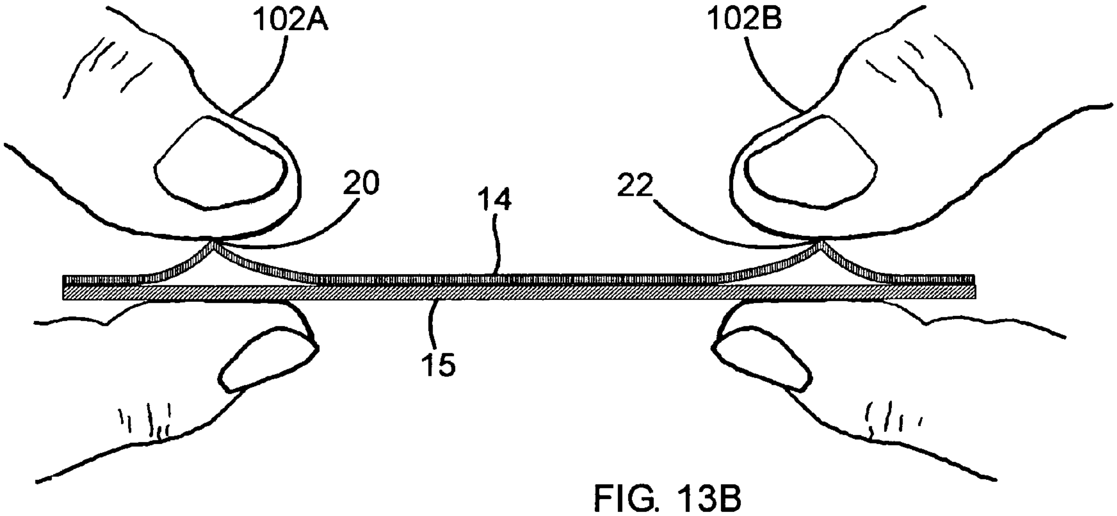
FIG. 13B is a cross-sectional view of the moveable animated display device taken along the line 13—13 in FIG. 11 in a compressed condition.

With combined reference to FIGS. 12, 13A, and 13B, it can be seen that an animation of the display device 10 can be achieved by a user's grasping the display device 10 with the user's left and right hands 100A and 100B with the user's left and right thumbs 102A and 102B preferably disposed on or near locator marks 55 and 56, which coincide with central portions of the biasing formations 20 and 22. The user can induce the display device 10 from the uncompressed condition of FIG. 13A to the compressed condition of FIG. 13B by pressing on the locator marks 55 and 56. When the display device 10 is so compressed, the animation portions of the pressure plate 14 and the base member 15 are induced into full contact not only by the pressing on the locator marks 55 and 56 but also by the force of the opposed tabs 54. Clear animation can then be accomplished by sliding the pressure plate 14 in relation to the base member 15.

With a plurality of exemplary embodiments and details of the present invention for a moveable animated display device disclosed 10, it will be appreciated by one skilled in the art that numerous changes and additions could be made thereto without deviating from the spirit or scope of the invention. This is particularly true when one bears in mind that the presently preferred embodiments merely exemplify the broader invention revealed herein. Those with major features of the invention in mind could craft embodiments that incorporate those major features while not incorporating all of the features included in the preferred embodiments.

Therefore, the following claims are intended to define the scope of protection to be afforded to the inventor. Those claims shall be deemed to include equivalent constructions insofar as they do not depart from the spirit and scope of the invention. It must be further noted that a plurality of the following claims may express certain elements as means for performing a specific function, at times without the recital of structure or material. As the law demands, such claim elements shall be construed to cover not only the corresponding structure and material expressly described in this specification but also all equivalents thereof.

I claim as deserving the protection of Letters Patent:

1. A moveable animated display device for displaying a plurality of images, the display device comprising:
- a pressure plate carrier;
- a pressure plate retained in relation to the pressure plate carrier;
- a plurality of coded images;
- a plurality of shutter elements slidably retained in relation to the plurality of coded images wherein the plurality of shutter elements and the plurality of coded images are disposed to a display side of the moveable animated display device whereby the plurality of coded images and the plurality of shutter elements can be slid in relation to one another to produce an animation of the moveable animated display device in an animation area; and at least one biasing formation in the pressure plate for inducing a biasing of at least a portion of the pressure plate toward the pressure plate carrier.

2. The moveable animated display device of claim 1 wherein the pressure plate is formed from a resiliently deflectable material and wherein the at least one biasing formation in the pressure plate comprises a crease formation in the pressure plate.

3. The moveable animated display device of claim 1 wherein the at least one biasing formation is formed to the display side of the moveable animated display device.

4. The moveable animated display device of claim 3 further comprising a second biasing formation in the pressure plate wherein the second biasing formation is formed to the display side of the moveable animated display device and wherein the biasing formations are disposed outboard of the animation area of the moveable animated display device.

5. The moveable animated display device of claim 1 wherein the plurality of coded images are disposed on one of the pressure plate carrier or the pressure plate, wherein the plurality of shutter elements are disposed on the other of the pressure plate carrier or the pressure plate, and wherein the pressure plate carrier is slidably retained in relation to the pressure plate.

6. The moveable animated display device of claim 5 wherein there are at least two biasing formations wherein a first biasing formation is formed to the display side of the moveable animated display device and wherein a second biasing formation is formed to an obverse side of the moveable animated display device.

7. The moveable animated display device of claim 5 wherein there are at least two biasing formations in the pressure plate wherein the biasing formations are formed to the display side of the moveable animated display device and wherein the biasing formations are disposed outboard of the animation area of the moveable animated display device.

8. The moveable animated display device of claim 5 wherein the at least one biasing formation is formed to the display side of the moveable animated display device and wherein the biasing formation is orthogonal to a path of travel of the pressure plate in relation to the pressure plate carrier.

9. The moveable animated display device of claim 8 wherein there are at least two biasing formations and wherein the at least two biasing formations are disposed outboard of the animation area of the moveable animated display device orthogonal to a path of travel of the pressure plate in relation to the pressure plate carrier.

10. The moveable animated display device of claim 5 wherein the pressure plate has a header portion and a footer portion and further comprising opposed tabs that project inboard from the header portion and the footer portion of the pressure plate whereby the pressure plate can be slidably engaged with the pressure plate carrier with the tabs disposed to an obverse side of the moveable animated display device while a body portion of the pressure plate is disposed to the display side of the moveable animated display device.

11. The moveable animated display device of claim 1 further comprising an animation layer with at least a portion thereof slidably interposed between the pressure plate and the pressure plate carrier and wherein one of the plurality of coded images and the plurality of shutter elements is disposed on the animation layer.

12. The moveable animated display device of claim 11 wherein the other of the plurality of coded images and the plurality of shutter elements is disposed on the pressure plate.

13. The moveable animated display device of claim 11 wherein there are at least two biasing formations in the pressure plate wherein the biasing formations are formed to the display side of the moveable animated display device and wherein the biasing formations are disposed outboard of the animation area of the moveable animated display device.

14. The moveable animated display device of claim 13 wherein the pressure plate is formed from a resiliently deflectable material and wherein the biasing formations in the pressure plate comprise crease formations in the pressure plate.

15. The moveable animated display device of claim 11 further comprising registration marks disposed on the pressure plate and corresponding registration marks disposed on the animation layer for enabling an accurate alignment of the plurality of coded images in relation to the plurality of shutter elements.

16. The moveable animated display device of claim 11 further comprising opposed projections coupled to the pressure plate carrier for guiding and aligning the animation layer in relation to the pressure plate and the pressure plate carrier.

17. The moveable animated display device of claim 11 further comprising a base member and a cover member wherein the cover member is hingedly coupled at a proximal portion thereof to a proximal portion of the base member wherein one of the animation layer and the pressure plate carrier is coupled to a distal portion of the base member and wherein the other of the animation layer and the pressure plate carrier is hingedly coupled to the cover member distally in relation to the hinged coupling of the cover member to the base member whereby a pivoting of the cover member in relation to the base member will induce a sliding of the pressure plate carrier in relation to the animation layer thereby to produce an animation effect as the plurality of shutter elements sequentially complete the plurality of coded images.

18. The moveable animated display device of claim 17 wherein the base member, the cover member, the pressure plate carrier, and the animation layer each comprises a panel of material.

19. The moveable animated display device of claim 18 wherein there is a hinged coupling along a fold line between at least two of the base member, the cover member, the pressure plate carrier, and the animation layer and further comprising a line of surface variations disposed along at least a portion of the fold line for inducing an accurate location and alignment of the fold line.

20. The moveable animated display device of claim 19 wherein the line of surface variations comprises a line of perforations.

21. A moveable animated display device for displaying a plurality of images, the display device comprising:

a base member with a proximal edge and a distal edge;

a cover member with a proximal edge and a distal edge wherein the proximal edge of the cover member is hingedly coupled to the proximal edge of the base member;

a first panel coupled to the base member;

a second panel coupled to the cover member in a location displaced from the proximal edge of the cover member whereby a pivoting of the cover member in relation to the base member will induce a relative movement of the first panel relative to the second panel;

a plurality of coded images retained relative to one of the first panel and the second panel; and a plurality of shutter elements retained relative to the other of the first panel and the second panel;

whereby a relative movement of the first panel relative to the second panel will produce an animation of the moveable animated display device in an animation area.

22. The moveable animated display device of claim 21 further comprising a pressure plate coupled to one of the first panel and the second panel whereby the other of the first panel and the second panel can be received between the pressure plate and the first panel or the second panel.

23. The moveable animated display device of claim 22 further comprising at least one biasing formation in the pressure plate for inducing a biasing of at least a portion of the pressure plate.

24. The moveable animated display device of claim 23 wherein the pressure plate is formed from a resiliently deflectable material and wherein the at least one biasing formation in the pressure plate comprises a crease formation in the pressure plate.

25. The moveable animated display device of claim 21 further comprising registration marks disposed on the pressure plate and corresponding registration marks disposed on the panel to which the pressure plate is coupled for enabling an accurate alignment of the plurality of coded images in relation to the plurality of shutter elements.

26. The moveable animated display device of claim 21 further comprising opposed projections coupled to the panel to which the pressure plate is coupled for guiding and aligning the other of the first and second panels in relation to the pressure plate.

27. The moveable animated display device of claim 21 wherein each of the base member, the cover member, the first panel, and the second panel comprises a panel of material.

28. The moveable animated display device of claim 27 wherein there is a hinged coupling along a fold line between at least two of the base member, the cover member, the first panel, and the second panel and further comprising a line of surface variations disposed along at least a portion of the fold line for inducing an accurate location and alignment of the fold line.

29. The moveable animated display device of claim 28 wherein the line of surface variations comprises a line of perforations.

* * * * *